No. 800,632. PATENTED OCT. 3, 1905.
D. F. CURTIN.
WEIGHT INDICATOR FOR WEIGHING SCALES.
APPLICATION FILED JAN. 4, 1905.
2 SHEETS—SHEET 1.
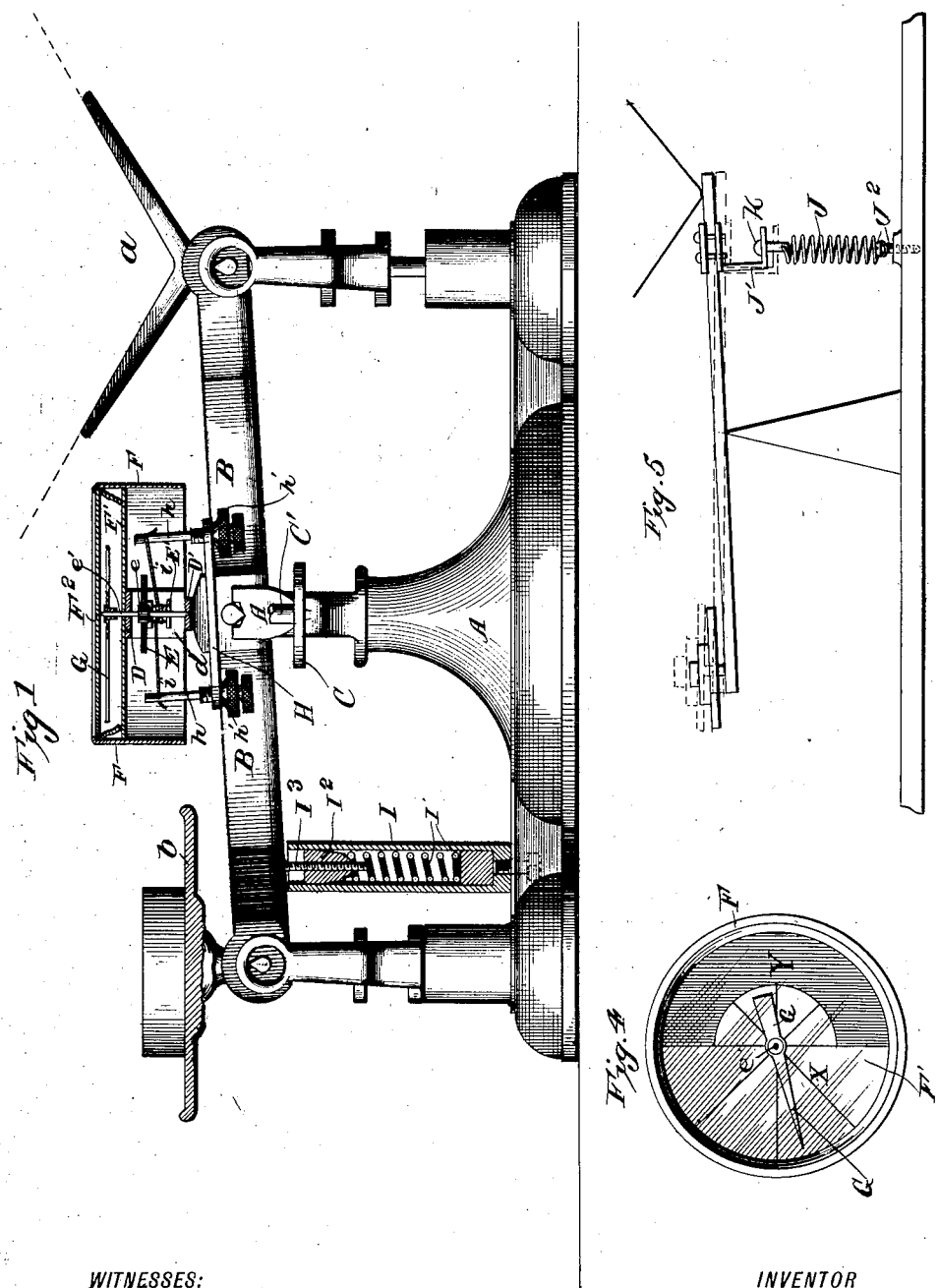
WITNESSES:
INVENTOR
DAVID F. CURTIN
BY
ATTORNEYS

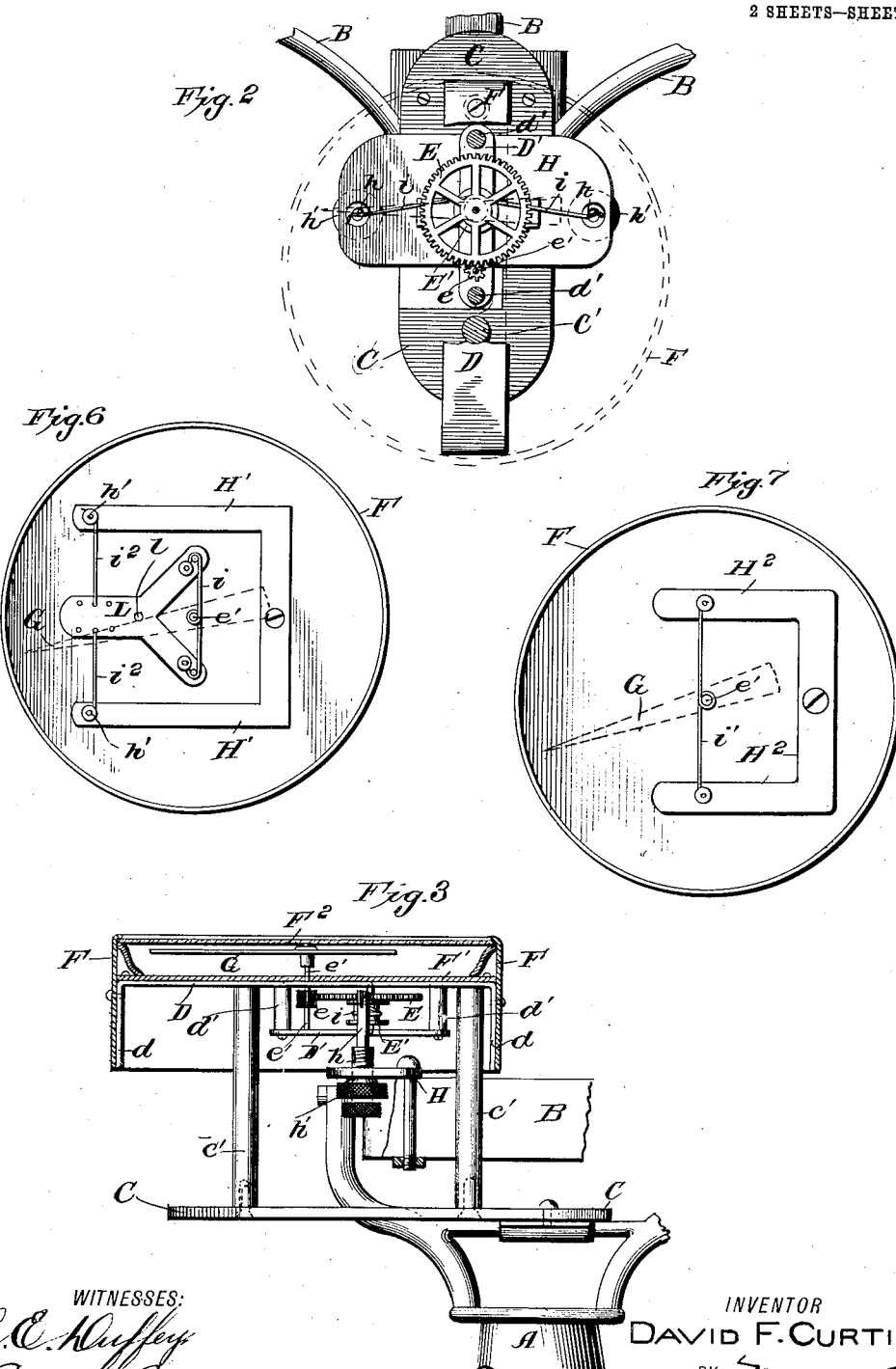

UNITED STATES PATENT OFFICE.

DAVID F. CURTIN, OF CHICAGO, ILLINOIS.

WEIGHT-INDICATOR FOR WEIGHING-SCALES.

No. 800,632.  Specification of Letters Patent.  Patented Oct. 3, 1905.

Application filed January 4, 1905. Serial No. 239,567.

*To all whom it may concern:*

Be it known that I, DAVID F. CURTIN, a citizen of the United States, residing at Chicago, in the county of Cook and State of Illinois, have invented a new and useful Improvement in Weight-Indicators for Weighing-Scales, of which the following is a specification.

My invention is in the nature of an attachment to weighing-scales designed to give notice to the dealer when the approximate quantity of material is on his scales, so that the remaining portion may be carefully poured to avoid overplus. This overplus of weight, which is frequently given, especially in busy times, is a serious factor of loss, especially in such commodities as sugar, where the profits are small. On the other hand, if the dealer having allowed an overplus to get upon the scales undertakes to take out the overplus this is usually interpreted as an act of parsimony, and in addition to the time it takes to make several tentative efforts at a balance it is very probable that the paper bag will be split by the scoop in the effort to take out the overplus. It will be seen, therefore, that a simple and reliable means for indicating to the dealer when the requisite quantity of material is nearly on the scales, so that he may carefully pour the rest, is a very great desideratum. In my prior patent, No. 779,993, granted January 10, 1905, I have shown and described an attachment to accomplish this result which was designed for platform-scales having one horizontally-extended scale-beam.

My present invention is designed to provide an attachment applicable to even-balance scales in which the scale-beam is fulcrumed in the middle and bears a scoop on one end and a weight-tray on the other and in which the commodity is balanced by counterweights.

My invention consists in the novel construction and arrangement of parts of the attachment and in their combination with the even-balance scales, which I will now proceed to describe with reference to the drawings, in which—

Figure 1 is an elevation of the even-balance scales with the casing and parts of my attachments in section. Fig. 2 is a plan view of the indicator mechanism, partly broken away and with the casing removed. Fig. 3 is a side view of the same with casing on. Fig. 4 is a plan view of the indicator-dial. Fig. 5 is a detail of a modification of the initially-acting spring, and Figs. 6 and 7 are modifications of the actuating mechanism for the indicator-hand.

In the drawing Fig. 1, A represents the central fulcrum-post, and B the scale-beam, which is fulcrumed in the middle upon the post A and bears at one end the scoop-holder $a$ and at the other end the weight-tray $b$, on which are placed the detachable weights to balance the goods to be weighed in the scoop. It is this type of even-balance counter-scales for which my present invention is especially designed.

My indicator attachment is mounted on some stationary part of the fulcrum-post A and consists of a horizontal stationary clamp-plate C, suitably connected to the fulcrum-post and having two or more upright adjustable pillars $c'$ $c'$, which support at the top a light metal frame composed of a horizontal bar D, having downturned ends $d$ $d$ and a short subjacent and parallel bar D', connected to the bar D by short posts $d'$ $d'$. Between the bars D and D' are arranged a horizontal gear-wheel E and a small drum E', rigidly secured to the same shaft as the gear-wheel E, which shaft is journaled in bearings in the upper and lower bars D and D'. Meshing with the gear-wheel E is a small pinion $e$, fixed on a vertical shaft $e'$. This shaft $e'$ extends above the bar D and enters a circular case F. This case is screwed to the downturned ends $d$ $d$ of the bar D or is otherwise secured to the rigid frame and bears on the top a horizontal dial F' and a glass face F². On the shaft $e'$ and within the case between the glass face and the dial is an index-hand G.

On the scale-beam B and moving with it is mounted a plate H, which extends on each side of the fulcrum of the scale-beam and bears at its outer end upright posts $h$ $h$, which are screw-threaded at their lower ends and have at the bottom milled heads and check-nuts $h'$, by which they are adjustably secured to the supporting-plate H. To the upper ends of these posts are attached the ends of a flexible cord $i$, which is wound around the drum E' of the gear-wheel E. To tighten and adjust this cord on the drum, the posts $h$ are turned axially and fixed in proper position by means of the check-nuts.

It will be seen that one of the posts is on one side of the fulcrum of the scale-beam and the other is on the opposite side, and as the posts, together with the plate H, are rigidly attached to the scale-beam it follows that when the scale-beam moves about its fulcrum-center one of these posts approaches and the other recedes from the drum. This causes the cord to be wound upon one side and unwound on the other, and this imparts a rotary motion to the gear-wheel, pinion, and index-hand, causing the latter to be deflected over the graduated dial. The index-hand on the dial will thus indicate with an amplified range the movement of the scale-beam.

The scale-beam in weighing comes to a balance when it reaches the horizontal line, and when the weights are on the weight-tray this end of the beam is down, as in Fig. 1, and the other end descends to the horizontal even-balance position whenever the requisite quantity of material is put into the scoop on said other end of the beam. Now to give notice when the approximate quantity of material is on the scales, so that the rest may be poured carefully and no overplus be allowed to get on, it is necessary to slightly lift the beam on the weight side of the fulcrum, and to prevent falsifying the weighing this lifting action must cease just after the weight end of the beam begins to rise and before a true poise on the horizontal line is attained. For this purpose I place under the scale-beam, near the weight-tray, a spring whose effect is to lift the weight end of the scale-beam through the initial part of its rise and then lose its influence thereon just before the horizontal balance position is attained. This spring may be arranged in two different positions to act upon the scale-beam to produce the same result. The preferred application is shown in Fig. 1, and it is arranged as follows: An upright cylindrical casing I is mounted on the base of the scales near the weight-tray end of the beam, and in it is housed a spiral spring I'. On top of this spring rides a block I², through which passes a screw-threaded stem I³, which is vertically adjustable through said block. This screw-stem is so adjusted in its block that it will touch the weight end of the beam and press it upward with a regulated tension during the first part of its upward movement, and then for the balance of the way up the tension of the spring is fully expended, and the scale-beam as it approaches the horizontal balance position will leave the stem I³ and be wholly disconnected therefrom and independent of its action, so that correct weighing is not interfered with. By the use of springs of different strength, but same diameter of coil and same length, the upward pressure on the scale-beam may be varied to lift with any degree of force desired—such as an ounce, a quarter-pound, a half-pound, &c.—so that the scale-beam indicator-hand will commence to move whenever the commodity being poured into the scoop comes within an ounce, a quarter, or a half pound of the requisite weight, and then the dealer pours in the balance of the commodity, with such caution as to avoid the overplus, until the true horizontal balance is reached.

It will be seen that although the spring becomes disconnected from the scale-beam after the initial rise of the weight end of the scale-beam the indicator-hand is never disconnected, and by dividing the dial into two sections, as shown in Fig. 4 by the diagonally-shaded part X and the vertically-shaded part Y, the first part of the movement of the index-hand over the part X of the dial may be made to give warning of the approach of the proper quantity of the commodity, and the continued movement of the hand over the second part Y of the dial will indicate the down-weight or overplus in case too much of the commodity is allowed to flow into the scoop. In other words, the movement of the index-hand over the first part X of the dial will indicate the approach of the beam toward the true balance and the movement of the hand over the part Y will indicate the movement of the beam beyond the true-balance position. My attachment therefor not only gives warning of the approach of the requisite quantity of the commodity, but also indicates the overplus, if any is allowed to pass in.

From the foregoing it will be understood that the initially-acting spring must always act against the gravity of the weights and with the gravity of the commodity. It will be obvious, however, that the character and point of application of this spring may be easily varied without changing the result. The spring already described is an expansion-spring, acting to lift the weight end of the beam by expansion. If the spring is located on the opposite side of the fulcrum, to pull down on the scale-beam it is obvious that the same result is reached. In Fig. 5 I have shown such a tension-spring. This spring J at its upper end is connected to a stem $k$, which extends freely through a hole in a horizontal hanger-arm J'. At its lower end this spring is anchored to the base by an adjusting-screw J². When the weights are on the opposite end of the beam, the scoop end is up, as shown, and a head on the stem $k$ is causing the spring to pull down on the hanger-bar to the required extent. When the horizontal balance position of the beam is reached, the hanger-bar J' leaves the head of the stem $k$ and moves freely down over the shank of the same without allowing the influence of the spring to be felt on the beam at all.

For imparting the movement of the scale-beam to the indicator-hand various changes may be made, as seen in Figs. 6 and 7. In Fig. 6 the plate H' is rigidly attached to the scale-beam and has two arms arranged on opposite sides of the fulcrum of the scale-beam. On these arms are mounted posts $h'$ $h'$, which by cords or wires $i^2$ are connected to a horizontal lever L, fulcrumed at $l$. This lever has two arms connected by a cord $i$, which is wound around the shaft $e'$ of the index-hand. As the scale-beam and plate H' tilt together lever L will be deflected and the cord $i$ will rotate the index-hand.

In the modification shown in Fig. 7 the cord $i$ is directly attached to the two arms of the plate $H^2$, fixed to the beam, and this cord is wrapped directly around the shaft $e'$ of the index-hand.

In Figs. 6 and 7 no mechanism is shown for connecting the plates H' and $H^2$ to the scale-beam. They are to be connected in any suitable or desirable way in harmony with the arrangement of plate H. (Shown in Figs. 1 and 3.) It is sufficient to state for the illustration of the modifications, Figs. 6 and 7, that the dial-frame F is stationary and the plates H' and $H^2$ move with the scale-beam.

Having thus described my invention, what I claim as new, and desire to secure by Letters Patent, is—

1. The combination with the beam and the central fulcrum-support in an even-balance scales; of a stationary framework mounted upon said support, a horizontal dial mounted thereon, a tilting frame fixed to the scale-beam and extending on both sides of the fulcrum, a flexible cord carried by the tilting frame, a vertical shaft with index-hand arranged on the face of the dial and pivoted in the stationary frame and means for causing the cord to rotate the index-hand by the tilting of the frame fixed to the scale-beam substantially as described.

2. The combination with the beam and the central fulcrum-support in an even-balance scales; of a stationary framework mounted upon said support, a horizontal dial mounted thereon, a tilting frame fixed to the scale-beam and extending on both sides of its fulcrum, a flexible cord carried by the tilting frame, a vertical shaft with index-hand arranged on the face of the dial and pivoted in the stationary frame, means for causing the cord to rotate the index-hand by the tilting of the frame fixed to the scale-beam, and a spring arranged to act initially upon the scale-beam in a direction to lift the weights of the weight-tray and then lose its influence on the scale-beam substantially as described.

3. The combination with the beam and the central fulcrum-support in an even-balance scales; of a stationary framework mounted upon said support, a horizontal dial mounted thereon, a tilting frame fixed to the scale-beam and extending on both sides of the fulcrum, a flexible cord carried by the tilting frame, a vertical shaft with index-hand arranged on the face of the dial and pivoted in the stationary frame, means for causing the cord to rotate the index-hand by the tilting of the frame fixed to the scale-beam, an expansion-spring arranged beneath the weight end of the scale-beam to lift the scale-beam by expanding during the initial portion of its rise substantially as described.

4. The combination with the beam and its central fulcrum-support in an even-balance scales; of a stationary framework mounted upon said support, a horizontal dial mounted thereon, a tilting frame fixed to the scale-beam and extending on both sides of its fulcrum, a flexible cord carried by the tilting frame, a vertical shaft with index-hand arranged on the face of the dial and pivoted in the stationary frame, means for causing the cord to rotate the index-hand by the tilting of the frame fixed to the scale-beam, an expansion-spring arranged beneath the weight end of the scale-beam, a case for containing the spring, a top bearing for the spring and means for adjusting said spring substantially as and for the purpose described.

5. The combination with the beam and the central fulcrum-support in an even-balance scales; of a stationary framework mounted upon said support, a horizontal dial mounted thereon, a tilting frame fixed to the scale-beam and having upright posts mounted on opposite sides of the fulcrum, a cord attached to these posts, a gear-wheel with drum having the cord wrapped around the latter, a vertical shaft with index-hand arranged on the face of the dial and pinion engaging said gear-wheel, and means for initially lifting the weight end of the scale-beam substantially as shown and described.

6. The combination with the beam and the central fulcrum-support in an even-balance scales; of a spring arranged beneath the scale-beam for initially lifting the weight end of the scale-beam and then losing its influence thereon, and an indicator with moving mechanism connected to and actuated by the scale-beam, said indicator having a dial divided into two parts, one of which indicates the movement of the scale-beam under the influence of the initially-acting lifting device, and the other of which indicates the continued movement of the scale-beam after the lifting device ceases to act on the scale-beam substantially as described.

DAVID F. CURTIN.

Witnesses:
SAMUEL WEISBERG,
JOSEPHINE FLYNN.